United States Patent [19]

Chang

[11] Patent Number: 5,478,645
[45] Date of Patent: Dec. 26, 1995

[54] MULTI-LAYER FILM HAVING SELF-LIMITING HEAT SEAL, AND METHODS RELATING THERETO

[75] Inventor: Clifford C. Chang, Midlothian, Va.

[73] Assignee: E. I. Du Pont de Nemours and Company, Wilmington, Del.

[21] Appl. No.: 295,139

[22] Filed: Aug. 24, 1994

Related U.S. Application Data

[63] Continuation-in-part of Ser. No. 114,273, Aug. 30, 1993, abandoned.

[51] Int. Cl.$^6$ .................................................. C09J 7/00
[52] U.S. Cl. ........................... 428/347; 428/349; 428/483
[58] Field of Search ....................................... 428/483, 480, 428/349, 347, 518

[56] References Cited

U.S. PATENT DOCUMENTS

| | | | |
|---|---|---|---|
| 3,960,636 | 6/1976 | Moffitt | 156/290 |
| 4,139,643 | 2/1979 | Hix et al. | 426/122 |
| 4,211,825 | 7/1980 | Shipman | 428/483 |
| 4,410,600 | 10/1983 | McGrail | 428/483 |
| 4,521,467 | 6/1985 | Berger | 428/35 |
| 4,571,363 | 2/1986 | Culbertson et al. | 428/332 |

FOREIGN PATENT DOCUMENTS

| | | | |
|---|---|---|---|
| 0175451 | 3/1986 | European Pat. Off. | 428/35 |
| 9317863 | 8/1993 | WIPO . | |

*Primary Examiner*—Jenna L. Davis

[57] ABSTRACT

The present invention relates generally to a multilayer packaging structure which: 1. has a relatively broad heat seal temperature, and 2. provides an easy open seal, even at very high heat seal temperatures. More specifically, the films of the present invention are preferably multilayer structures comprising: 1. a support film, such as a polyester; 2. an olefinic homopolymer or copolymer interface layer; and 3. a heat seal outer layer.

5 Claims, No Drawings

MULTI-LAYER FILM HAVING SELF-LIMITING HEAT SEAL, AND METHODS RELATING THERETO

This is a continuation-in-part of application Ser. No. 08/114,273 filed Aug. 30, 1993, now abandoned.

FIELD OF THE INVENTION

The present invention relates generally to multilayer packaging structures which: 1. have a relatively broad heat seal temperature (i.e. about 90° C. to about 200° C.), and 2. provide an easy open seal (i.e., less than about 250 grams/inch peel strength), even at very high heat seal temperatures (i.e. above about 150° C.). More specifically, the fills of the present invention are preferably multilayer structures comprising: 1. a support film, such as polyester; 2. an olefinic (homopolymer or copolymer) interface layer, such as olefinic polymer (including olefinic copolymers); and 3. a heat seal outer layer.

BACKGROUND OF THE INVENTION

Poly vinylidene chloride ("PVDC") coated polyester fills are known and are often used as heat-sealable packaging fills. However, halogenated fills and coatings are increasingly coming under environmental attack and are being subjected to increasing government regulation.

One possible solution to these problems is to replace the PVDC heat seal coating with other heat seal compositions. However, many heat seal compositions can be problematic. For example, copolyesters generally have a relatively narrow heat sealing range: 1. below this range the packaged product may have a tendency to leak; and 2. above this range, the packaged fill can be difficult to open or be subject to unwanted tearing when heat seals were pulled apart.

The present invention is an innovative solution to the above problems.

SUMMARY OF THE INVENTION

Overview

The present invention is directed to a novel and improved multilayer film comprising:
1. heat seal layer;
2. a break away interface layer which delaminates at a peel strength of less than 250 g/in, independent of heat seal temperature;
3. a support layer.

Once a heat sealing temperature is applied, the film's peel strength is advantageously limited by the interface layer, i.e., the interface layer will delaminate at a peel strength of less than about 250 grams per inch, notwithstanding the peel strength of the heat seal layer. Hence, the film can be used in a wide range of heat seal application, and the resulting heat seal will be effective in protecting the product but not so strong as to frustrate consumers as they attempt to open the package.

DETAILED DESCRIPTION OF THE PREFERRED EMBODIMENT AND BEST MODE

Support Layer

The support layer can be virtually any material capable of carrying the interface layer and heat-seal layer without interfering with the intended function of those two layers. The preferred support layer comprises polyester, most preferably biaxially oriented poly(ethylene terephthalate) ("oriented PET").

Useful polyester films of the present invention can be manufactured from various thermoplastic polyester resins, such as:
1. polyethylene terephthalate, polytetramethylene terephthalate,
3. polyethylene, 2,6-napthalate,
4. poly-1,4-cyclohexylene dimethyl terephthalate,
5. and the like Polyester copolymers may also be used, such as:
1. polyethylene terephthalate/isophthalate,
2. polyethylene terephthalate/adipate,
3. polyethylene terephthalate/sebacate,
4. polyethylene terephthalate/sulphoisophthalate,
5. polyethylene terephthalate/azelate,
6. and the like.

Biaxially oriented polyethylene terephthalate homopolyester is preferred.

The polyester films of the present invention can be manufactured by an extrusion process, such as a cast film or blown film process. In a cast film process, the polyester resin is first heated to a molten state and then extruded through a wide slot die in the form of an amorphous sheet. The sheet-like extradate is rapidly cooled or "quenched" to form a cast sheet of polyester by contacting and traveling partially around a polished, revolving casting drum.

Alternatively, the extrudate can be blown in a conventional blown film process. Regardless of the process however, the polyester sheet is preferably uni-axially or biaxially (preferably biaxially) stretched in the direction of film travel (machine direction) and/or perpendicular to the machine direction (transverse direction), while being heated to a temperature in the range of from about 80° C. to 160° C., preferably about 90° C. to 100° C. the degree of stretching may range from 3.0 to 5.0 times the original cast sheet unit dimension, preferably from about 3.2 to about 4.2 times the original cast sheet dimension.

Interface Layer

The interface layer is preferably derived from a free radical polymerize homopolymer or copolymer composition wherein at least one polymerized monomer is an alpha olefin hydrocarbon. Preferred interface compositions include acid copolymers, particularly ethylene/acrylic acid and ethylene/methacrylic acid, and acid copolymers wholly or partially neutralized with a cation, such as sodium or zinc (also called "ionomers"), low density polyethylene CLDPE"), linear low density polyethylene CLLDPE"), ultra low density polyethylene (ULDPE), polyvinyl esters and carboxylic acid derivatives of polyvinyl esters. The most preferred polyvinyl ester is ethylene vinyl acetate ("EVA"), polyvinylacetate CPVA") and copolymers thereof.

The interface material preferably defines a peel strength of less than 250 grams per inch, even at heat seal temperatures of 160° C., 180° C., 200° C. or greater.

Suitable EVA polymers include those having EVA contents ranging from about 5 to 50 weight percent EVA incorporation. As the vinyl acetate content increases, clarity improves and low-temperature flexibility, stress-crack resistance and impact strength all generally increase; on the other hand, there generally is an accompanying decrease in softening and sealing temperatures, as well as barrier properties. Above about 50% by weight vinyl acetate incorporation, the material is generally completely amorphous.

The EVAs of the present invention are advantageous, because of their flexibility, toughness (even at low temperatures), adhesion characteristics and stress-crack resistance. Other compositions having similar such features could be appropriate according to the present invention, depending upon the particular end use.

EVAs are made by the copolymerization of ethylene and vinyl acetate. Most often, this free radical polymerization (initiated by either a peroxide or perester) is done in a conventional stirred autoclave or a high pressure tublar reactor.

The acetate side chain brings polarity to the EVA resin. As polarity increases, tackiness generally also increases, as well as, adhesion to a variety of substrates and solubility in common solvents. As the molecular weight of EVAs increases, so does melt viscosity, heat seal strength, toughness, flexibility, stress-crack resistance, and hot tack strength. Preferred melt index of the EVAs of the present invention range from about 2 dg/min to over 500 dg/min. Molecular weight can be controlled by the addition of chain transfer agents, such as propylene or isobutylene during polymerization.

The EVAs of the present invention should be processed at relatively low temperatures, since acetoxy bonds tend to break and acetic acid is formed at temperatures above about 450° F.

Polyethylene imine CPEI") is a common adhesion primer and is generally synthesized from aziridine (or ethylene imine) through sulfonic acid esterification of ethanolamine. The monomer is then reacted in an acid catalyzed ting opening homopolymerization to form the PEI molecule. Hence conventional PEI chemistry does not fall within the definition of appropriate interface materials described above, and indeed, PEI is an inappropriate interface material since it generally provides a peel strength of greater than about 250 g/in.

Support Layer+Interface Layer.

The interface layer is preferably applied to the support layer by conventional coating techniques. Prior to coating the polyester film surface, the film may be surface-treated in any conventional manner, depending upon the particular application and performance required from the final product.

Electric corona discharge is a conventional surface treatment which is commonly performed on polyester films to enhance the film's surface qualities, especially its adhesive and printing properties. Electric corona discharge methods and apparatus are described in U.S. Pat. Nos. 3,057,792 and 4,239,973.

For uniaxially oriented film, the corona treatment followed by the coating may occur during the in-line manufacturing process, either before stretch orientation or after. If the corona treatment and coating occurs before stretch orientation, heating the film before stretch orientation will generally be necessary to drive off the coating solvent.

The polyester sheet can be coated with the interface layer using any of the well known coating techniques. For example, the film may be coated by roller coating, spray coating, gravure coating, slot coating, or extrusion coating preferably gravure or roller coating. The heat applied to the film during the subsequent preheating, stretching, and heat-setting stages is generally sufficient to evaporate the coating solvent.

The coated, oriented polyester fill may then be heat treated for a period of time necessary to crystallize the fill. Crystallization imparts dimensional stability and good tensile properties to the polyester fill. Oriented polyethylene terephthalate fill may be heat set at a temperature ranging from 0° C. to 240° C., preferably from 215° C. to 235° C. The coated crystalline, oriented polyester fill is generally then wound onto a roll.

An alternative to this on-line process is to coat the film off-line (after manufacture of the fill is complete). Off-line operations can be conducted by a secondary facility, such as a converter, who obtain intermediate fills and further processes it for specific customers.

The two layers can also be coextruded. Preferred coextrusion methods include tublar-blown fill processes and flat die, chill-roll casting processes. Both such processes are well known, conventional co-extrusion processes.

Heat Seal Coating

The preferred heat seal coating is a copolyester. The preferred copolyester component of the present invention is derived from at least the following components:

1. about 10–60 mole % terephthalic acid (hereafter, monomer "A")
2. about 10–60 mole % ethylene glycol (hereafter, monomer "B"); and
3. about 5–60 mole % of third monomer being a secondary di-acid (hereafter monomer "C") and/or a secondary diol (hereafter monomer "D"), wherein,
1. the intrinsic viscosity of the final copolyester composition is prefereable in the range of about 0.5–1.0, more preferably 0.58–0.8; and
2. the glass transition temperature of the final composition is less than about 100° C., more preferable, less than about 80° C., and most preferably less than about 75° C. Examples of monomer C include:

1. succinic acid,
2. adipic acid,
3. azelaic acid,
4. sebacic acid,
5. 1,10 dodecanedicarboxylic acid,
6. phthalic acid,
7. isophthalic acid,
8. dodecanedioic acid,
9. methoxypolyalkylene glycol
10. neopentyl glycol
11. propylene glycol,
12. 1,4 butane diol,
13. trimethylene glycol,
14. propylene glycol,
15. hexamethylene glycol,
16. tetramethylene glycol,
17. diethylene glycol,
18. and the like.

Preferred such comonomers include azelaic acid and isophthalic acid.

Support Layer+Interface Layer+Heat Seal Layer

The heat seal layer is preferably applied to the interface layer in a solution coating process similar to the coating process for applying the interface layer to the support layer. Such solution coating processes are well known and any conventional such process can be used.

EXAMPLE 1

Support Layer: biaxially oriented polyethylene terephthalate, 0.5 mil thickness (hereafter, SUPPORT LAYER)

Interface Layer:
1. an EVA polymer from Morton International sold under the trademark "ADCOTE® X17". (hereafter "INTERFACE MATERIAL 1"); or
2. an EVA supplied by Pierce & Stevens sold under the trademark "PROXMELT® E4020" (hereafter "INTERFACE MATERIAL 2") (CCC, Aug. 16, 1994)

Heat Seal Layer:
1. 49002P® copolyester available from Morton International which is believed to be the polymerization product of ethylene glycol with a diacid composition comprising about 45 mole % azealaic acid and about 55 mole % terephthalic acid (hereafter COPOLYESTER A), and 2. Vitel 1200® available from Shell Chemical which is believed to be the polymerization product of ethylene glycol with diacid composition comprising about 40 mole % isophthalic acid and 60 mole % terephthalic acid (hereafter COPOLYESTER B)

CONTROL FILM: a 50/50 weight blend of Copolyester A and Copolyester B was solution coated onto the Support Layer in an mount of about 0.5 gram copolyester per square meter of support layer.

SAMPLE 1: the Support layer was solution coated with the Interface Material in an amount of about 0.4 grams Interface Material 1 per square meter of Support Layer; thereafter the interface layer was solution top coated with the copolyester material used in the Control in an amount of 0.8 grams copolyester per square meter.

SAMPLE 2: was substantially the same as Sample 1, except that about 0.5 grams of Interface Material 2 (per square meter of Support Layer) was substituted for Interface Material 1 and the copolyester top coating was in an amount of about 0.6 grams per square meter.

The target coating weight: for each layer in each sample was 0.5 grams/m$^2$.

Equipment:

The coating equipment used 12 inch wide feed rolls, coating rolls, and a drying tower at about 104° C. (220° F.)(counter-current air drying). The interface coating solutions were about 7.5 to about 15 weight percent solids in a 23/77 weight % ratio tetrahydrofuran/toluene solution at 50° C. temperature. The copolyester coating solutions were about 10 to about 20 weight percent solids in a tetrahydrofuran solution comprising about 5 weight percent fillers, waxes, stabilizers and the like at about 50° C. An 11 inch wide PET film was fed into the coating bath at about 50 feet per minute, and a dwell time during drying of about 0.2 minutes.

Results:

Each of the multi-layer films was heat sealed (coated side-to-coated side) at temperatures ranging from about 100°–200° C. A multiple of three sealed samples for each film were tested at each condition as a reproducibility check. The average results are shown below:

| Film | Average Heat Seal Strength (g/inch @ 0.25 sec$^1$ & 5 psig$^2$) | | | | | |
| --- | --- | --- | --- | --- | --- | --- |
| | 100° C. | 120° C. | 140° C. | 160° C. | 180° C. | 200° C. |
| CONTROL | 142 | 217 | 247 | 312* | 267* | 370* |
| SAMPLE 1 | 242 | 208 | 182 | 207 | 227 | 160 |
| SAMPLE 2 | — | 123 | 88 | 170 | 125 | 123 |

1. dwell time
2. pressure
*Sealed samples tore when heat seals were pulled apart.

Peel strengths above about 50 g/inch are generally sufficient to seal a package for many uses, and seals having peel strengths above about 250 g/inch are generally rather difficult for an average consumer to pull apart. The seal strength values of the control film were a strong function of heat seal temperature and seals were stronger than desired over the higher temperature range, causing film tearing when copolyester heat seals were pulled apart.

Samples 1 and 2 indicate excellent heat seal performance over a wide seal temperature range.

The present invention, with the interface layer, resulted in heat seals of copolyester coatings that were effective in product protection but not so strong as to cause film tearing when heat seals were pulled apart.

What is claimed is:

1. A multilayer film comprising:

a) a copolyester heat seal layer derived from at least the following components: 10–60 mole % of a terephthalic acid and 10–60 mole % of an ethylene glycol and 5–60 mole % of a member of the group consisting of a diacid other than terephthalic acid and a diol other than ethylene glycol, b) an interface layer comprising a member of the group consisting of alpha olefin polymers and copolymers, the interface layer being between a support layer and the heat seal layer, and c) a support layer comprising a member of the group consisting of a polyester and a copolyester, whereby the bond strength between
      (i) the interface layer, and
      (ii) a member of the group consisting of the support layer and the heat seal layer is less than 250 grams per inch.

2. The film of claim 1 wherein the support layer comprises oriented polyethylene terephthalate.

3. The film of claim 2 wherein the interface layer is derived from a member of the group consisting of vinyl ester and an acid derivative of a vinyl ester.

4. The film of claim 2 wherein the interface layer comprises ethylene vinyl acetate.

5. The film of claim 4 wherein the heat seal layer is a blend of two or more members of the group consisting of polyesters and copolyesters.

* * * * *